F. W. GERSTENSCHLAGER.
ATTACHMENT FOR AUTOMOBILES.
APPLICATION FILED NOV. 22, 1915.
1,215,017.
Patented Feb. 6, 1917.
2 SHEETS—SHEET 1.
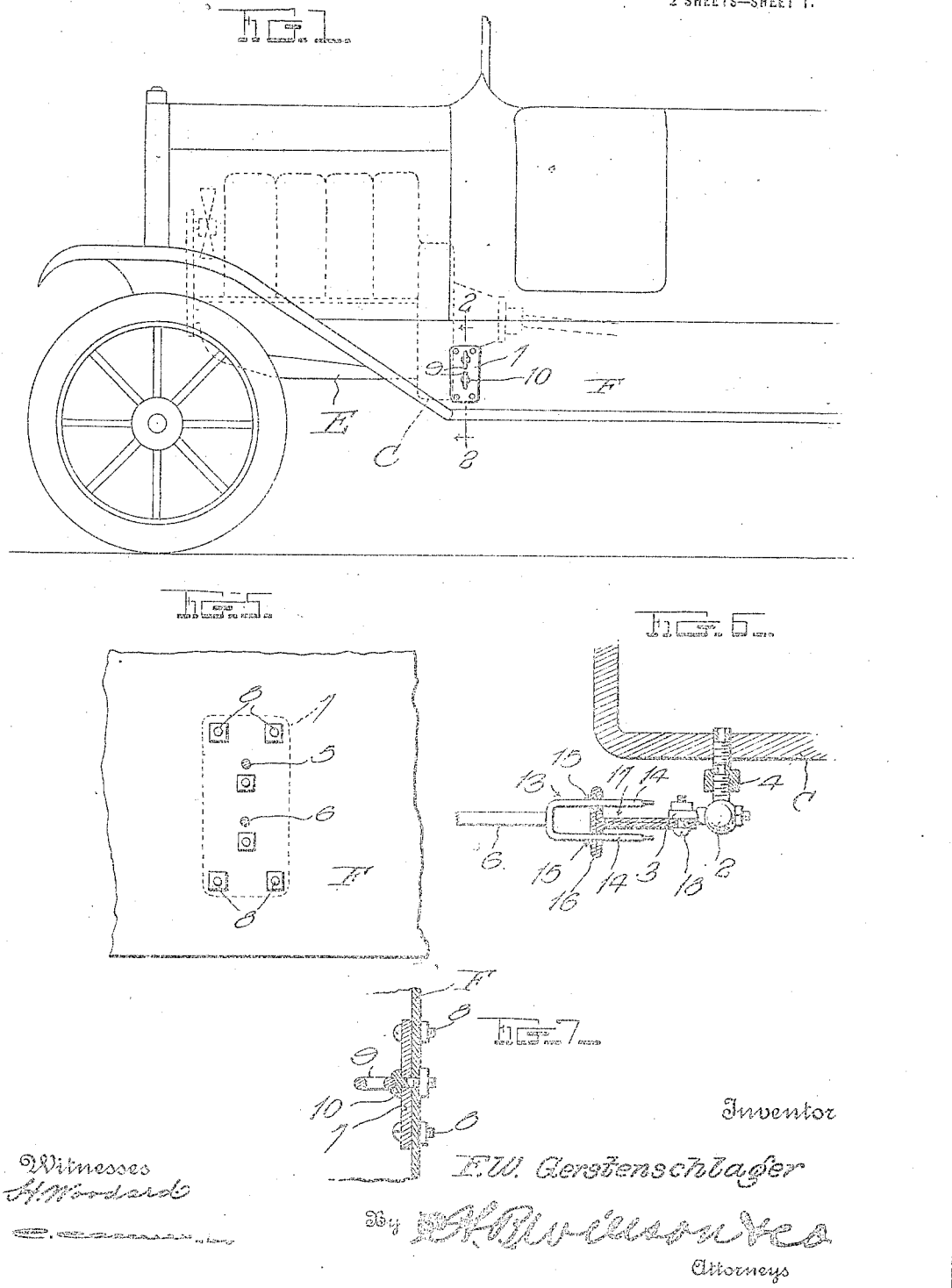

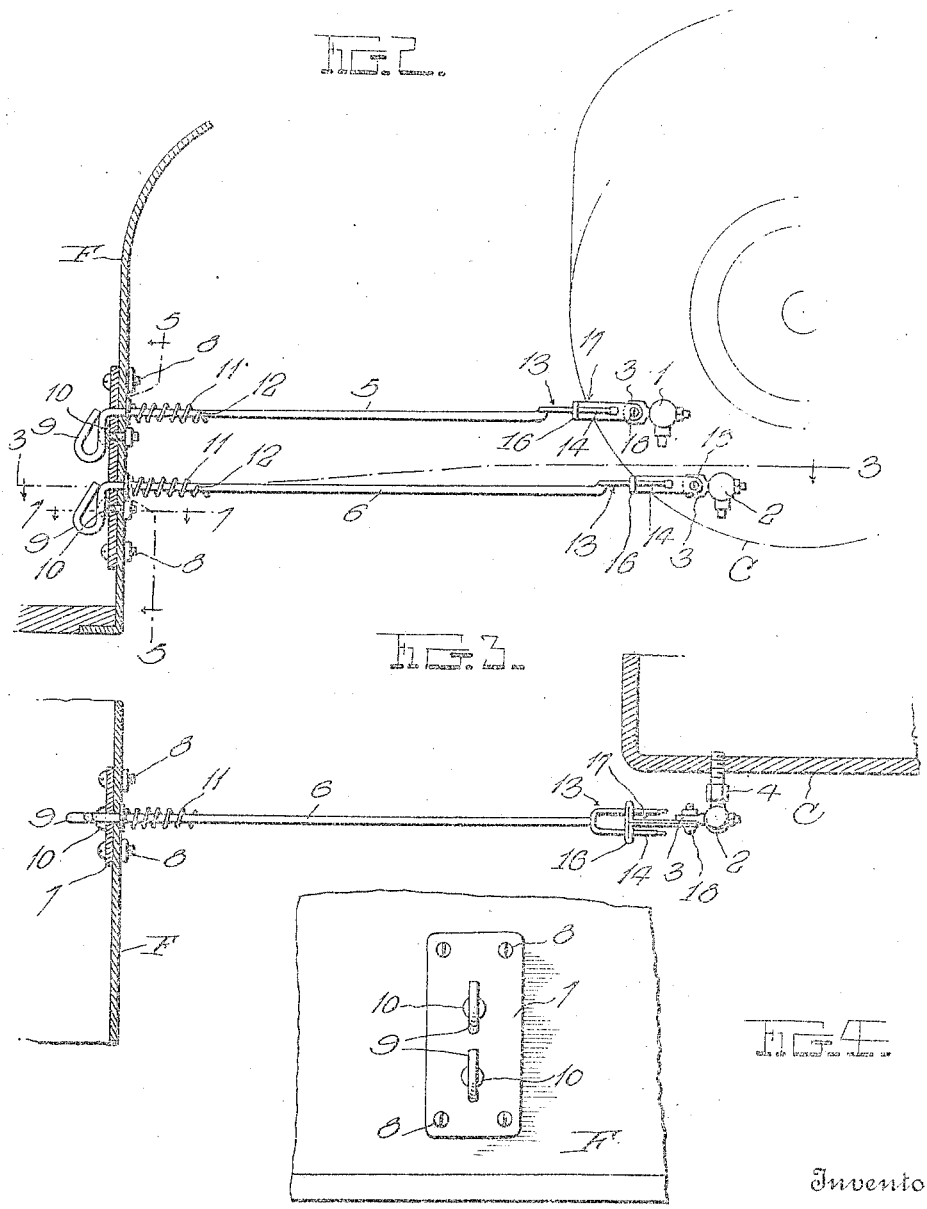

UNITED STATES PATENT OFFICE.

FREDRICK WILLIAM GERSTENSCHLAGER, OF HARBOR BEACH, MICHIGAN.

ATTACHMENT FOR AUTOMOBILES.

1,215,017.  Specification of Letters Patent.  Patented Feb. 6, 1917.

Application filed November 22, 1915. Serial No. 62,635.

*To all whom it may concern:*

Be it known that I, FREDRICK WILLIAM GERSTENSCHLAGER, a citizen of the United States, residing at Harbor Beach, in the county of Huron and State of Michigan, have invented certain new and useful Improvements in Attachments for Automobiles; and I do declare the following to be a full, clear, and exact description of the invention, such as will enable others skilled in the art to which it appertains to make and use the same.

This invention relates to improvements in attachments for automobiles, particularly means for more readily ascertaining the level of the oil within the crank case of the engine.

In a certain class of automobiles, particularly those of the Ford type, the only means of ascertaining the amount of oil within the crank case is by opening either one or both of the pet or gage cocks on the crank case which are disposed one above the other in the ordinary manner of disposing such cocks. As these gage cocks are disposed beneath the engine and body of the car, it is very difficult to open them without getting beneath the automobile. Therefore, I have provided a device by which either one of these two gage cocks may be opened without getting beneath the car, that is, they may be operated by an operating handle which is rotatably mounted on a portion of the fender of the automobile.

With this general object in view, my invention resides in the novel features of construction, combination and arrangement of parts which will hereinafter be more particularly described and claimed.

In the accompanying drawings:

Figure 1 is a side elevation of a portion of an automobile showing the application of my invention thereto;

Fig. 2 is a vertical transverse section on the line 2—2 of Fig. 1;

Fig. 3 is a horizontal section substantially on the line 3—3 of Fig. 2;

Fig. 4 is an enlarged detail view of the attaching plate;

Fig. 5 is a vertical section on the line 5—5 of Fig. 2;

Fig. 6 is an enlarged detail horizontal section showing the connection between the operating handle and the gage cock;

Fig. 7 is a detail horizontal section on the line 7—7 of Fig. 2.

In the several figures of the drawings, I have shown a portion of an automobile having an engine E provided with the usual crank case C in the end of which, a pair of vertically spaced pet cocks 1 and 2 are threaded.

These pet or gage cocks 1 and 2 are of the usual construction each having an operating handle 3 to which my improved device is adapted to be applied. As the cocks 1 and 2 are ordinarily disposed quite close to the wall of the crank case, it becomes necessary before attaching my device, to provide some means for spacing said cocks away from the wall of the crank case. Any suitable means may be provided for this arrangement, but I preferably employ extension bushings 4, one of which is threaded into each of the openings in the crank case which normally receive the cocks 1 and 2 after the latter are removed. After the bushings have been placed in position, the cocks 1 and 2 are then threaded into the outer end of said bushings thus spacing the same from the crank case a sufficient distance to allow my device to be applied.

This device comprises broadly a pair of operating rods 5 and 6, one of which is adapted to coact with each of the handles 3; said rods being rotatably mounted in an opening formed in the fender F on one side of the automobile. The openings formed in the fender F to receive the rods are adapted to be covered by a flat plate 7 secured to the outer surface thereof by the bolts 8, thus affording means for rotatably mounting the rods 5 and 6, while at the same time presenting a very neat appearance. The ends of the rods which extend beyond said plate 7 are provided with suitable operating handles 9 which are held against accidental movement by the keepers 10, here shown in the form of round headed bolts having enlarged notches in their heads into which the handles 9 are adapted to spring when the device is not in use. Expansion springs 11 having one of their ends fixed to each of the rods 5 and 6 and their other ends contacting with the inner face of the fender F serve as means for holding the handles 9 within their keepers, the tension of the springs being sufficient to hold the handles in the notches of the keepers until manually moved. These springs 11 surround the rods 5 and 6 as shown, the ends which are fixed to the rods being passed through apertures 12 therein.

The opposite ends of the rods 5 and 6, or those to which the gage cock handles 3 are secured, are provided with forks 13, the arms 14 of which are slidably received in openings 15 formed in the heads 16 of T-shaped members 17, the outer ends of the shanks of which are secured to one of the handles 3, which have been apertured to receive the fastening bolts 18. The openings 15 which receive the arms of the forks are somewhat larger than the diameter of said arms, thus providing a loose sliding engagement between the forks and the T-shaped members, and preventing injury to the gage cocks when the machine is passing over rough roads. The outer free ends of the arms of the forks are flattened to a slight extent to prevent accidental disengagement from the T-shaped members. These T-shaped members may either be constructed of a solid piece of metal or in the manner shown, which consists of forming both the head and shank of the member of double thickness of metal, although the whole is formed of but a single strip bent into the proper form.

In an automobile to which the device is applied, the gage cocks are vertically spaced on the crank case but are disposed in different vertical planes, in other words, the distance of one gage cock from the fender is greater than the distance of the other gage cock therefrom. This necessitates one of the rods 6 to be considerably longer than the other although it is obvious that the other parts of the device can be similarly constructed. The length of these rods can be very readily changed to suit the type of machine upon which they are used without departing from the spirit of the invention.

The type of engine upon which the device is used, is considered to contain a sufficient amount of lubricating oil if said oil reaches the level of the upper gage cock 1. That is, if the oil drips out of the gage cock 1 when the same is opened, it is unnecessary to place any more oil in the crank case. Therefore, when it is desired to determine the amount of oil within the crank case, the upper handle 9 is moved in a direction to cause the handle 3 of the gage cock to be turned in a direction to open the same. After the cock 1 has been opened a sufficient length of time, the handle 9 is turned to close the same, said handle springing back into the notch in the keeper 10. If no oil has dripped out of the cock 1 when the same was opened, the lower cock 2 is then opened in a similar manner to determine if the oil has receded below the level of the second gage cock.

From the foregoing description, it will be seen that I have produced a very simple device by which the gage cocks on the crank case of an automobile engine may be readily opened or closed without getting beneath the engine as is usually necessary.

Having thus described my invention, what I claim as new is:

1. In a device of the class described, a pet cock, an operating rod, a fork on the end of said rod, a T-shaped member having its shank secured to the handle of said cock, the head of said member being loosely connected to the arms of said fork, a handle on the opposite end of said rod for rotating the same to open or close the cock, means to prevent accidental rotation of said rod.

2. In a device of the class described, a pet cock, an operating rod, a fork on one end of said rod, a T-shaped member having its shank secured to the handle of said cock, the head of said member having openings on the opposite sides of the shank, said openings being adapted to slidably and loosely receive the arms of said fork, a handle on the opposite end of said rod for rotating the same to open or close the cock, and means to prevent accidental rotation of said rod.

3. In a device of the class described, a pet cock, an operating rod, a U-shaped fork secured at its base to one end of said rod, a T-shaped member formed from a single piece of material bent upon itself to form a double shank and head, said member being secured by its shank to the handle of said pet cock, the head thereof having an opening on each side of said shank to loosely and slidably receive the arms of said fork, the free ends of said arms being flattened to prevent disengagement of the member therefrom, a handle on the opposite end of said rod, and means for locking said handle against rotation.

4. The combination with a vehicle, of a pet cock, an operating rod, a slidably, non-rotatable connection between one end of said rod and the handle of said pet cock, a plate secured to the vehicle and having an opening to rotatably receive said rod, a handle on the other end of said rod, a keeper carried by the plate and comprising a bolt having a notch in the head thereof to receive the handle of said rod, and a spring on said rod to move the same in a direction to hold said handle in said notch.

In testimony whereof I have hereunto set my hand in presence of two subscribing witnesses.

FREDRICK WILLIAM GERSTENSCHLAGER.

Witnesses:
HAROLD MURPHY,
JOHN F. MURPHY.